United States Patent
Sanders et al.

(10) Patent No.: US 8,422,024 B2
(45) Date of Patent: Apr. 16, 2013

(54) HIGH PERFORMANCE HOLLOW-CORE OPTICAL-FIBER FILTER FOR OPTICAL ROTATION SENSING

(75) Inventors: Glen A. Sanders, Morristown, NJ (US); Lee K. Strandjord, Morristown, NJ (US); Tiequn Qiu, Morristown, NJ (US); John Feth, Morristown, NJ (US); Andrew W. Kaliszek, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/150,976

(22) Filed: Jun. 1, 2011

(65) Prior Publication Data

US 2012/0307251 A1    Dec. 6, 2012

(51) Int. Cl.
*G01B 9/02* (2006.01)

(52) U.S. Cl.
USPC .......................................................... 356/480

(58) Field of Classification Search .................. 356/460, 356/480, 454; 385/125
See application file for complete search history.

(56) References Cited

U.S. PATENT DOCUMENTS

| | | | |
|---|---|---|---|
| 4,358,851 A | 11/1982 | Scifres et al. | |
| 5,327,446 A | 7/1994 | Waynant | |
| 5,528,367 A * | 6/1996 | Putnam et al. | 356/480 |
| 6,334,019 B1 * | 12/2001 | Birks et al. | 385/125 |
| 6,901,101 B2 | 5/2005 | Frick | |
| 7,292,761 B2 | 11/2007 | Miyake | |
| 7,697,143 B2 | 4/2010 | Sanders et al. | |
| 7,742,665 B2 * | 6/2010 | Digonnet et al. | 385/43 |
| 7,782,527 B1 * | 8/2010 | Brooks et al. | 359/341.1 |
| 7,933,020 B1 | 4/2011 | Strandjord et al. | |
| 2003/0068150 A1 | 4/2003 | Ariel | |
| 2004/0233458 A1 | 11/2004 | Frick | |
| 2005/0105867 A1 | 5/2005 | Koch | |
| 2006/0098694 A1 * | 5/2006 | Hongo | 372/6 |
| 2007/0242276 A1 * | 10/2007 | Hughes et al. | 356/461 |
| 2007/0280304 A1 | 12/2007 | Deile | |
| 2010/0290057 A1 | 11/2010 | Qiu et al. | |

FOREIGN PATENT DOCUMENTS

| | | |
|---|---|---|
| EP | 1847804 | 10/2007 |
| WO | WO9610282 | 4/1996 |
| WO | WO2004111695 | 12/2004 |

OTHER PUBLICATIONS

European Patent Office, "Office Action", "from Foreign Counterpart of U.S. Appl. No. 13/150,976", Oct. 19, 2012, pp. 1-6, Published in: EP.

European Patent Office, "European Search Report", "from Foreign Counterpart of U.S. Application", Oct. 1, 2012, pp. 1-4, Published in: EP.

(Continued)

*Primary Examiner* — Tarifur Chowdhury
*Assistant Examiner* — Michael P Lapage
(74) *Attorney, Agent, or Firm* — Fogg & Powers LLC

(57) ABSTRACT

A hollow-core optical-fiber filter is provided. The hollow-core optical-fiber filter includes a hollow-core optical fiber having a first end-face and an opposing second end-face. The first end-face and the second end-face set a fiber length. The hollow-core optical-fiber filter also includes a first reflective end-cap positioned at the first end-face and a second reflective end-cap positioned at the second end-face. When an optical beam from a laser is coupled into one of the first end-face or the second end-face, an optical output from the opposing end-face has a narrow linewidth and low frequency noise fluctuations.

20 Claims, 7 Drawing Sheets

OTHER PUBLICATIONS

Marty et al., "All-Fiber Multi-Purpose Gas Cells and Their Applications in Spectrocopy", "Journal of Lightwave Technology", Apr. 15, 2010, pp. 1236-1240, vol. 28, No. 8.

Wang et al., "Tunable Fabry-Perot filter using hollow-core photonic bandgap fiber and micro-fiber for a narrow-linewidth laser", May 3, 2011, pp. 1-5, vol. 19, No. 10.

* cited by examiner

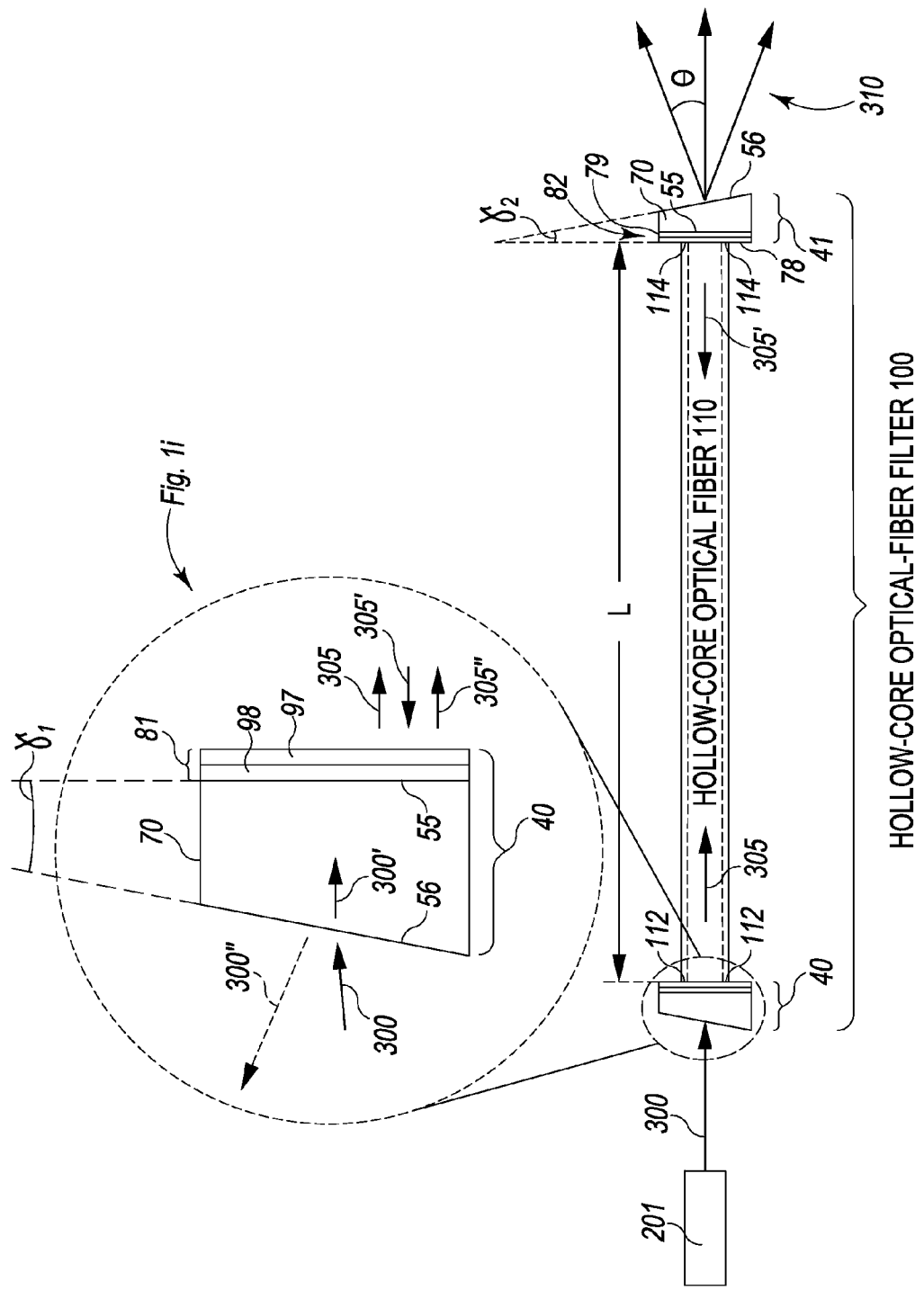

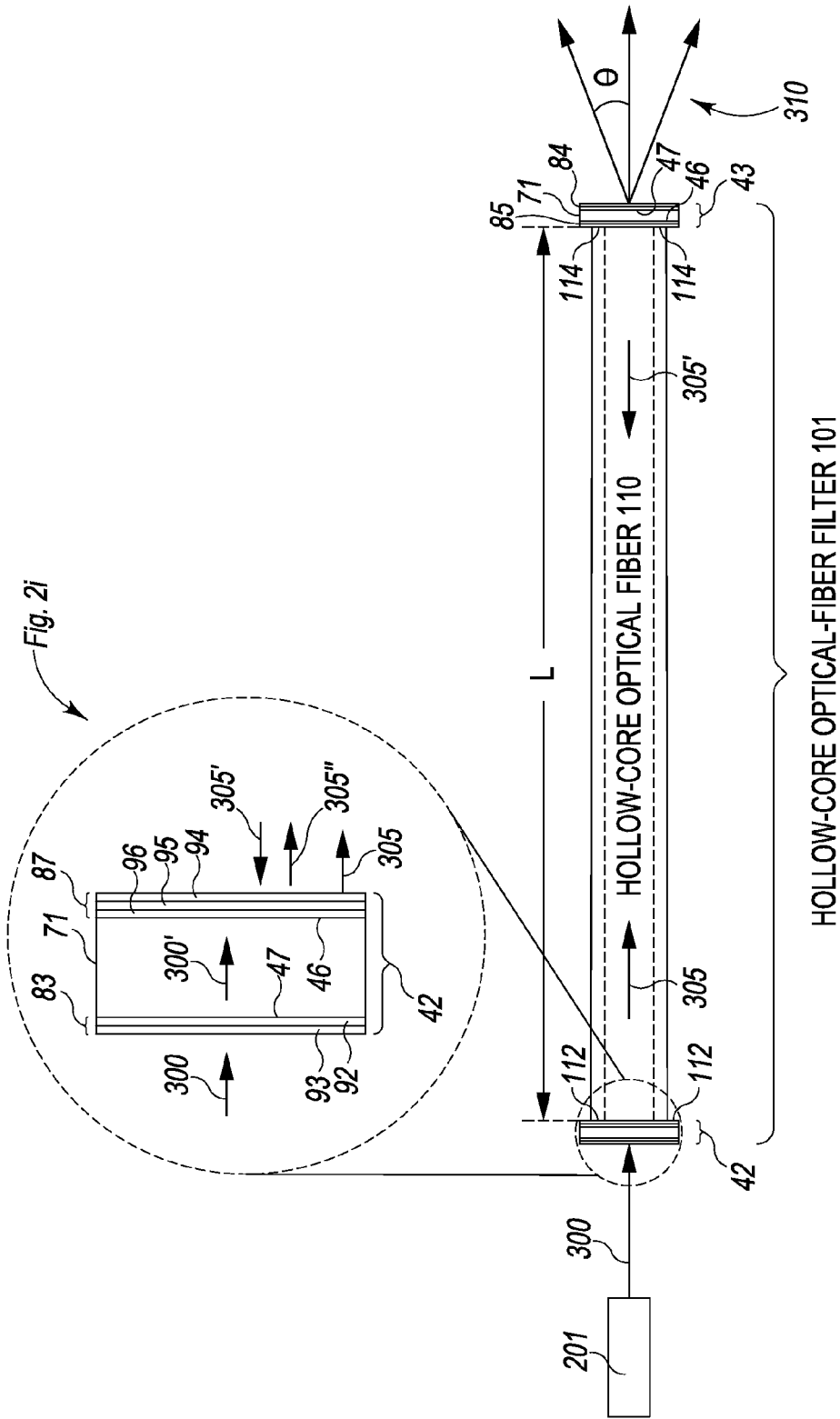

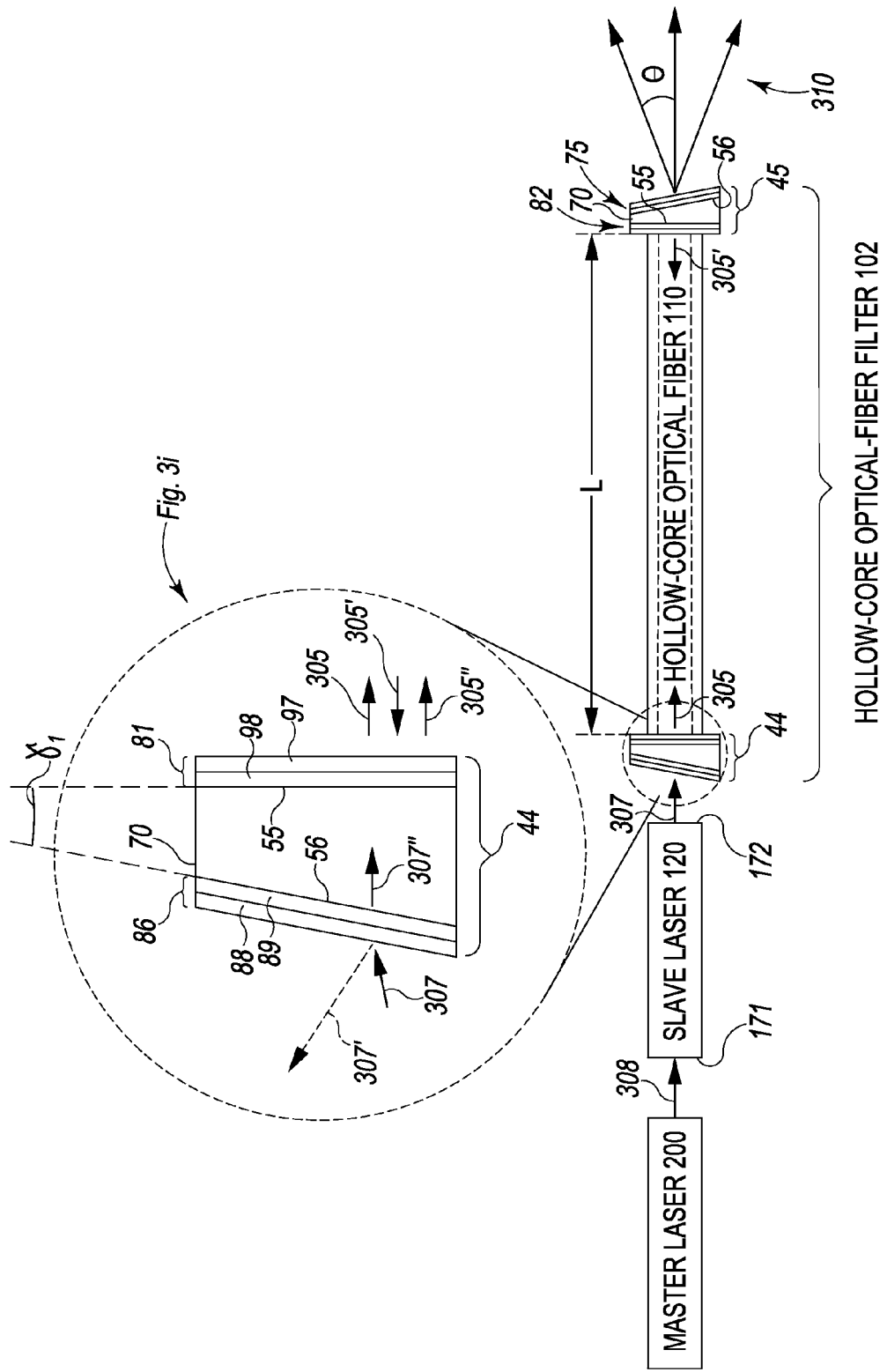

HIGH PERFORMANCE HOLLOW-CORE OPTICAL-FIBER FILTER FOR OPTICAL ROTATION SENSING

BACKGROUND

A resonator-fiber-optic gyroscope (RFOG) is a rotation rate measurement apparatus that uses a fiber ring resonant cavity to enhance the signal to noise ratio in the measurement of a rotation-induced Sagnac effect within the resonant cavity. The basic principle of RFOG operation is that the effective resonator path length in a clockwise (CW) and counter-clockwise (CCW) direction is different when the rotation of the fiber ring resonant cavity has a nonzero component in a resonator axis. By measuring the CW and CCW resonance frequency difference, which is proportional to Sagnac phase shift due to rotation, the RFOG can accurately measure the rotation rate.

Lasers provide coherent light to the fiber ring resonant cavity to identify its resonance frequencies. Semiconductor lasers are a low cost option for source lasers. However, semiconductor lasers typically have significant phase noise that can lead to degradation of the RFOG performance.

SUMMARY

The present application relates to a hollow-core optical-fiber filter. The hollow-core optical-fiber filter includes a hollow-core optical fiber having a first end-face and an opposing second end-face. The first end-face and the second end-face set a fiber length. The hollow-core optical-fiber filter also includes a first reflective end-cap positioned at the first end-face and a second reflective end-cap positioned at the second end-face. When an optical beam from a laser is coupled into one of the first end-face or the second end-face, an optical output from the opposing end-face has a narrow linewidth and low frequency noise fluctuations.

The details of various embodiments of the claimed invention are set forth in the accompanying drawings and the description below. Other features and advantages will become apparent from the description, the drawings, and the claims.

DRAWINGS

FIGS. 1A-3 are block diagrams of embodiments of hollow-core optical-fiber filters in accordance with the present invention;

Like reference numbers and designations in the various drawings indicate like elements.

DETAILED DESCRIPTION

Figure 1B:
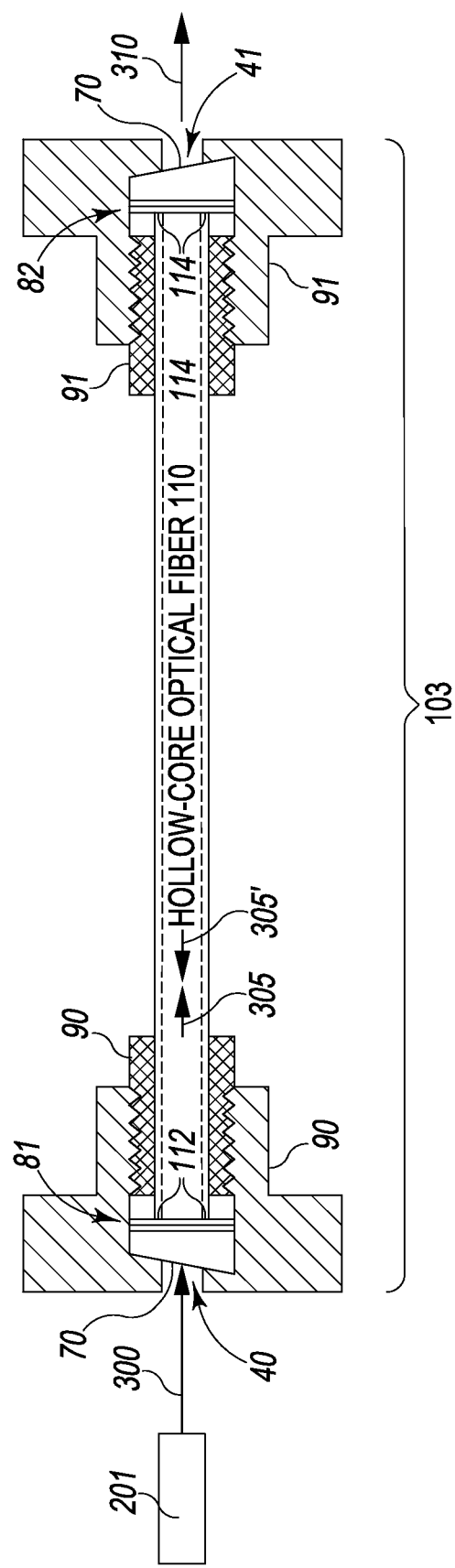

In order for lasers (such as, laser diodes) to be used in a resonator-fiber-optic gyroscope (RFOG) without degrading performance, the phase noise of lasers must be reduced. Embodiments of the resonator-fiber-optic gyroscopes described herein include a frequency stabilized reference laser to provide a reference optical beam with low phase noise for the RFOG system. The lasers (slaves) that are used for measuring the resonance frequency of the sensing resonator are phase locked with a servo to the reference (master) laser so that the low phase noise of the master laser within the servo bandwidth is transferred to the slave lasers. The master laser is frequency stabilized by using a frequency discriminator in a negative feedback loop that controls the phase/frequency fluctuations of the master laser. Thus, the slave lasers have low noise within the bandwidth of the electro-optic servo.

The embodiments of the resonator-fiber-optic gyroscopes described herein include hollow-core optical-fiber filters coupled to receive output from each slave laser. The hollow-core optical-fiber filters reduce the remaining phase noise of each laser; namely phase fluctuations at higher frequencies than the servo bandwidth. Outputs from the hollow-core optical-fiber filters are used to probe the resonances of the fiber resonator coil (gyro sensing coil). The hollow-core optical-fiber filters have the desired features needed for high performance rotation measurement by the RFOG. These desired features include very narrow bandwidth, small size, high power handling capability, low spurious back reflections, manufacturability, tunability, and potential for low cost. The hollow-core optical-fiber filter described herein is a very high finesse, narrow linewidth, and low cost filter.

FIGS. 1A-3 are block diagrams of embodiments of hollow-core optical-fiber filters in accordance with the present invention. FIG. 1A is a block diagram of a hollow-core optical-fiber filter 100 coupled to a laser 201. The hollow-core optical-fiber filter 100 includes a hollow-core optical fiber 110 that has a first end-face 112 and an opposing second end-face 114, a first reflective end-cap 40 positioned at (in contact with) the first end-face 112, and a second reflective end-cap 41 positioned at (in contact with) the second end-face 114. The first reflective end-cap 40 is also referred to herein as "first beveled end-cap 40". The second reflective end-cap 41 is also referred to herein as "second beveled end-cap 41".

The first end-face 112 includes the annular surface at a first end of the hollow-core optical fiber 110 and the plane enclosed by the annular surface. The second end-face 114 includes the annular surface at a second end of the hollow-core optical fiber 110 and the plane enclosed by the annular surface. As defined herein, light coupled into or out of the first end-face 112 and the second end-face 114 is coupled into or out of the plane enclosed by the annular surface as well as, in some cases, into or out of the annular surface of the hollow-core optical fiber 110. The term "coupling" as used herein is "optically coupling" in which at least a portion of light (depending on the coupling efficiency) emitted (output) from a source (a laser or an optical fiber) is coupled into a receiving optical fiber. The coupling can be provided directly from the source to the receiving optical fiber (e.g., butt-coupling) or the coupling can be provided by optical elements positioned between the source and the receiving optical fiber to align and direct an optical beam output from the source. The coupled light propagates in the receiving optical fiber. The coupling efficiency is maximized when the numerical aperture of the source and receiving optical fiber are matched. In one implementation of this embodiment, lenses (not shown in FIGS. 1A-3) are positioned between the source and receiving optical fiber to optimize the coupling. The hollow-core optical fiber 110 is also referred to herein as "fiber 110".

In the embodiment shown in FIG. 1A, the first reflective end-cap 40 and second reflective end-cap 41 are beveled plates 70 of a transparent material (such as glass) on which a reflective coating is deposited. The beveled plate of transparent material 70 is also referred to herein as "prism 70". As shown in FIG. 1i, the prism 70 has a first surface 55 and a second surface 56.

The first beveled end-cap 40 includes the first surface 55, which has a first reflectivity $R_1$ based on the reflective coating 81, and a second surface 56. The first surface 55 and the second surface 56 of the first beveled end-cap 40 are in planes that intersect at a first acute angle $\gamma_1$ (see FIG. 1i). The second beveled end-cap 41 includes a first surface 55, which has a second reflectivity $R_2$ based on the reflective coating 82, and a second surface 56. The reflectivities $R_1$ and $R_2$ each represents the ratio of the light intensity reflected (from the surfaces) to the intensity of light incident on that surface. The first surface 55 and the second surface 56 of the second beveled end-cap 41 are in planes that intersect at a second acute angle $\gamma_2$. When an optical beam 300 from a laser 201 is coupled into one of the first end-face 112 or the second end-face 114, a resonant cavity is established between the first surface 55 of the first beveled end-cap 40 and the first surface 55 of the second beveled end-cap 41. In one implementation of this embodiment, the first acute angle $\gamma_1$ equals the second acute angle $\gamma_2$.

When an optical beam 300 from a laser 201 is coupled into either the first end-face 112 or the second end-face 114, an optical beam 310 that is output from the opposing end-face (i.e., the second end-face 114 or the first end-face 112, respectively) has a narrow linewidth and low frequency noise fluctuations. The divergence of the output optical beam 310 is indicated by the angle $\theta$. The optical beam 310 that is output from the opposing second end-face 114 through the reflective coating 82 has a narrow linewidth and low frequency noise fluctuations. For example, the optical beam 310 can have a frequency noise level substantially lower than a few Hz/√HZ outside the servo bandwidth.

The first reflective coating 81 is also referred to herein as a first reflective surface 81. The first reflective coating 81 on the first surface 55 of the prism 70 includes thin film layers 97 and 98. The thicknesses and indexes of the thin film layers (e.g., thin film layer 97 and 98) on the first surface 55 of the prism 70 together form a highly reflective surface for light at the wavelength of the optical beam 300 at approximately normal incidence (for example, within 5 degrees of incidence). The thin film layers 97 and 98 are representative of a plurality of dielectric layers designed for the desired transmission and reflection with low loss. The thin film layers 97 and 98 provide low loss, highly reflective mirrors with a small amount of transmission, so that light propagating within the hollow-core optical fiber 110 that is incident on the input end-face 112 or the output end-face 114 is almost all reflected back into the hollow-core optical fiber 110 to produce a resonator. The small coefficient of transmission allows a small portion of the light to be coupled into and out of the fiber resonator 100.

In one implementation of this embodiment, only one layer of a thin film 97 or 98 is deposited to coat the first surface 55 of the prism 70 to form the first reflective surface 81.

The first reflective end-cap 40 is positioned at the first end-face 112 of the hollow-core optical fiber 110 with the first reflective surface 81 adjacent to the first end-face 112. The first reflective end-cap 40 is positioned at the first end-face 112 of the hollow-core optical fiber 110 in a manner in which the mode field of the optical beam 300 propagating within the prism 70 has negligible expansion (divergence) within the prism 70.

The second reflective coating 82 is also referred to herein as a second reflective surface 82. The thicknesses and indexes of refraction of the second reflective coating 82 (thin film layers 78 and 79) on the first surface 55 of the prism 70 together form the second reflective surface 82 that is highly reflective at the wavelength of the optical beam 300 at approximately normal incidence (for example, within 5 degrees of incidence). The second reflective surface 82 has the second reflectivity $R_2$. In one implementation of this embodiment, the first reflective surface 81 and the second reflective surface 82 are formed from the identical thin film layers on the prisms 70 that have same index of refraction. In this case, the first reflective surface 81 and the second reflective surface 82 have the same reflectivity (i.e., $R_1$ equals $R_2$).

The second reflective end-cap 41 is positioned at the second end-face 114 of the hollow-core optical fiber 110 with the second reflective surface 82 adjacent to the second end-face 114. The second reflective end-cap 41 is positioned at the second end-face 114 of the hollow-core optical fiber 110 such that the mode field of the optical beam 310 propagating within the prism 70 has negligible expansion beyond the second end-face 114.

As shown in FIG. 1i, a portion of the incident optical beam 300 reflected from the second surface 56 is represented by a dashed arrow 300". The portion of the optical beam 300 transmitted through second surface 56 is represented by arrow 300'. The portion of the optical beam 300' transmitted through the first reflective surface 81 and coupled to the hollow-core optical fiber is represented by arrow 305.

As shown in FIG. 1, the optical beam 305 propagates through the hollow-core optical fiber 110 and is incident on the second reflective surface 82. The portion (i.e., $R_2$) of the optical beam 305 that reflected by the second reflective surface 82 is represented by the arrow 305'. The optical beam 305' propagates through the hollow-core optical fiber 110 and is incident on the first reflective surface 81. The optical beam reflected by the first reflective surface 81 is represented by the arrow 305" as shown in FIG. 1i. The wavelength of the optical beam 300 is the same as the wavelength of the optical beams 300', 300", 305, 305', 305", and 310.

In this manner, an optical beam 300 from a laser 201 is coupled into the first end-face 112 and a resonant cavity is established between the first reflective surface 81 and second reflective surface 82. The first acute angle $\gamma_1$ is selected to ensure that any portion of the optical beam 305' that is transmitted through the first end-face 112 of the hollow-core optical fiber 110 into the prism 70 (i.e., 1-$R_1$) is not reflected from the second surface 56 back into the hollow-core optical fiber 110. Likewise, the first acute angle $\gamma_1$ between the first surface 55 and the second surface 56 is also selected to ensure that any portion of the optical beam 300' that is reflected from the first reflective surface 81 back into the prism 70 (i.e., $R_1$) is not re-reflected from the second surface 56 back into the hollow-core optical fiber 110. The second acute angle $\gamma_2$ is selected for a similar functionality.

In one implementation of this embodiment, the first reflectivity $R_1$ and the second reflectivity $R_2$ are greater than 0.90. In another implementation of this embodiment, the first reflectivity $R_1$ and the second reflectivity $R_2$ are greater than 0.97.

The hollow-core optical-fiber filter 100 is bidirectional, so when an optical beam 300 emitted from a laser 201 is coupled into either the first end-face 112 or the second end-face 114, an optical beam output 310 from the opposing end-face has a narrow linewidth and low frequency noise fluctuations.

In the hollow-core optical-fiber filter 100, and the length L of the fiber, the reflectivity $R_1$ and $R_2$ of the first and second reflective surfaces 81 and 82, respectively, and the mode field size and numerical aperture (NA) of the fiber are selected to: 1) reduce the possibility of stimulated Brillouin scattering (SBS) and other non-linear effects; 2) allow the desired power throughput; 3) achieve the desired filter linewidth; and 4) allow for the desired packaging bend diameter. The divergence angle θ of the optical beam 310 and the index of refraction n of the hollow-core optical fiber 110 are used to calculate the numerical aperture NA, which is NA=n sin θ, where n is the refractive index of the medium outside the hollow-core optical fiber 110.

FIG. 1B is a block diagram of the hollow-core optical-fiber filter 103, which includes the hollow-core optical-fiber filter 100 of FIG. 1A and a first attachment fixture 90 and second attachment fixture 91. The first attachment fixture 90 is arranged to hold the first reflective end-cap 40 adjacent to the end-face 112 of the hollow-core optical fiber 110 and the second attachment fixture 91 is arranged to hold the second reflective end-cap 41 adjacent to the second end-face 114 of the hollow-core optical fiber 110. The first attachment fixture 90 and second attachment fixture 91 are exemplary of various types of attachment fixtures (such as ferrules) known in the art for holding components in close proximity to other components. It is to be understood that other types of attachments (such as adhesive attachments) can be used to hold the first reflective end-cap 40 and the second reflective end-cap 41 adjacent to the respective first and second end-faces 112 and 114 of the hollow-core optical fiber 110.

FIG. 2 is a block diagram of a hollow-core optical-fiber filter 101 coupled to a laser 201. The hollow-core optical-fiber filter 101 includes a hollow-core optical fiber 110 that is similar in structure and function to the hollow-core optical fiber 110 shown in FIGS. 1A and 1B. A first reflective end-cap 42 is positioned at the first end-face 112 and a second reflective end-cap 43 is positioned at the second end-face 114. The first reflective end-cap 42 and the second reflective end-cap 43 differ in structure but are similar in function to the first reflective end-cap 40 and the second reflective end-cap 41, respectively, of FIGS. 1A and 1B. The function of the hollow-core optical-fiber filter 101 is the same as that of the hollow-core optical-fiber filter 100 described above with reference to FIGS. 1A and 1B.

As shown in FIG. 2*i*, the first reflective end-cap 42 includes a plate 71, a first reflective surface 87 (also referred to herein as a "first reflective coating 87") having a first reflectivity $R_1$, and a first anti-reflective surface 83 (also referred to herein as a "first anti-reflective coating 83") opposing the first reflective surface 87. The second reflective end-cap 43 includes a plate 71, a second reflective surface 85 (also referred to herein as a "second reflective coating 85") having a second reflectivity $R_2$, and a second anti-reflective surface 84 (also referred to herein as a "second anti-reflective coating 84") opposing the second reflective surface 85. When an optical beam 300 from a laser 201 is coupled into one of the first end-face 112 or the second end-face 114 of the hollow-core optical fiber 110, a resonant cavity is established between the first reflective surface 87 and second reflective surface 85.

As shown in FIG. 2*i*, the plates 71 include a first surface 46 and a second surface 47. The first surface 46 and the second surface 47 of the plates 71 are approximately parallel to each other. The transparent material from which the plates 71 are formed is transparent to the wavelength of the optical beam 300.

The first reflective coating 87 is deposited on the first surface 46 of the first reflective end-cap 42. The first reflective coating 87 includes thin film layers 94, 95, and 96 as shown in FIG. 2*i*. The thicknesses and indexes of the thin film layers (e.g., thin film layer 94, 95, and 96) deposited on the first surface 46 of the plate 71 together form a highly reflective surface for light at the wavelength of the optical beam 300 at approximately normal incidence (for example, within 5 degrees of incidence). The thin film layers 94, 95, and 96 are representative of a plurality of dielectric layers designed for the desired transmission and reflection with low loss. The thin film layers 94, 95, and 96 provide low loss, highly reflective mirrors with a small amount of transmission, so that light propagating within the hollow-core optical fiber 110 that is incident on the input end-face 112 or the output end-face 114 is almost all reflected back into the hollow-core optical fiber 110 to produce a resonator. The small coefficient of transmission allows some light to be coupled into and out of the fiber resonator 101.

The first anti-reflective coating 83 is deposited on the second surface 47 of the plate 71 in the first reflective end-cap 42. The first anti-reflective surface 83 includes thin film layers 92 and 93 as shown in FIG. 2*i* deposited on the second surface 47 of the plate 71. The thicknesses and indexes of refraction of the thin film layers 92 and 93 on the plate 71 together form a surface that is anti-reflective at the wavelength of the optical beam 300. The thin film layers 92 and 93 are representative of a plurality of dielectric layers designed for the desired transmission and reflection. The thin film layers 92 and 93 provide low loss and have a high coefficient of transmission, so that light incident on the first anti-reflective coating 83 is mostly transmitted.

The first anti-reflective coating 83 has a reflectivity that is much less than the first reflectivity $R_1$. In one implementation of this embodiment, the reflectivity of the first anti-reflective coating 83 coating is on the order of 0.0001.

The second reflective coating 85 is deposited on the first surface 46 of the plate 71 in the second reflective end-cap 43. The second reflective coating 85 includes one or more thin film layers. The thicknesses and indexes of the thin film layers deposited on the first surface 46 of the plate 71 that forms the second reflective end-cap 43 together form a highly reflective surface for light at the wavelength of the optical beam 300 at approximately normal incidence (for example, within 5 degrees of incidence). The thin film layers that form the second reflective coating 85 provide low loss, highly reflective mirrors with a small amount of transmission, so that light incident on the output end-face 114 is mostly reflected back into the hollow-core optical fiber 110 to produce a resonator. The small coefficient of transmission allows some light to be coupled into and out of the fiber resonator 101.

The second anti-reflective coating 84 is deposited on the second surface 47 of the plate 71 that forms the second reflective end-cap 43. The second anti-reflective surface 84 includes thin film layers deposited on the second surface 47 of the plate 71 that forms the second reflective end-cap 43. The thicknesses and indexes of refraction of the thin film layers of the plate 71 that forms the second reflective end-cap 43 together form a surface that is anti-reflective at the wavelength of the optical beam 300. The thin film layer or layers forming the second anti-reflective surface 84 are typically a dielectric stack, which provides low loss and a high coefficient of transmission, so that light incident on the second anti-reflective coating 84 is mostly transmitted out of the plate 71. The second anti-reflective coating 84 has a reflectivity that is much less than the second reflectivity $R_2$. In one implementation of this embodiment, the reflectivity of the second anti-reflective coating 84 coating is on the order of 0.0001.

The first reflective end-cap 42 is positioned at the first end-face 112 of the hollow-core optical fiber 110 with the first reflective surface 81 adjacent to the first end-face 112. The first reflective end-cap 42 is positioned at the first end-face 112 of the hollow-core optical fiber 110 in a manner in which the mode field of the optical beam 300 propagating within the plate 71 has negligible expansion within the plate 71.

The second reflective end-cap 43 is positioned at the second end-face 114 of the hollow-core optical fiber 110 with the second reflective surface 85 adjacent to the second end-face 114. The second reflective end-cap 43 is positioned at the second end-face 114 of the hollow-core optical fiber 110 in a manner in which the mode field of the optical beam 300 propagating within the plate 71 has negligible expansion within the plate 71.

In one implementation of this embodiment, the first reflectivity $R_1$ equals the second reflectivity $R_2$. The first reflectivity $R_1$ and the second reflectivity $R_2$ are greater than 0.90. In one implementation of this embodiment, the first reflectivity $R_1$ and the second reflectivity $R_2$ are greater than 0.97.

FIG. 3 is a block diagram of a hollow-core optical-fiber filter 102 coupled to a master laser 200 via a slave laser 120. The function of the hollow-core optical-fiber filter 102 is the same as that of the hollow-core optical-fiber filter 100 described above with reference to FIGS. 1A and 1B. The hollow-core optical-fiber filter 102 includes a hollow-core optical fiber 110 that has a first end-face 112 and an opposing second end-face 114, a first reflective end-cap 44 positioned at the first end-face 112, and a second reflective end-cap 45 positioned at the second end-face 114.

The first reflective end-cap 44 is similar to the first reflective end-cap 40 of FIG. 1A and includes a first anti-reflection surface 86 (also referred to herein as first anti-reflective coating 86) on the second surface 56 of the prism 70. As shown in FIG. 3i, the first anti-reflective coating 86 includes the thin film layers 88 and 89.

The second reflective end-cap 45 is similar to the second reflective end-cap 41 of FIG. 1A and includes a second anti-reflection surface 75 (also referred to herein as second anti-reflective coating 75) on the second surface 56 of the prism 70. The addition of first anti-reflective coating 86 and the second anti-reflection coating 75 reduces the probability of light being reflected back into the hollow-core optical fiber 110 from the second surfaces 56.

As shown in FIG. 3, the master laser 200 emits an optical beam represented by an arrow 308. In one implementation of this embodiment, the master laser 200 is a frequency stabilized master laser outputting a reference optical beam 308 having low phase noise. For example, the optical beam 308 can have a frequency noise substantially smaller than a few Hz/√Hz within the servo bandwidth, but may have much higher noise level at frequency region higher than servo bandwidth. The optical beam 308 output from the master laser 200 is used to phase lock the slave laser 120. The slave laser 120 emits an optical beam 307 from the output end-face 172. The optical beam 307 is coupled into the hollow-core optical-fiber filter 102. The coupled optical beam 305 propagates multiple times in the resonant cavity formed in the hollow-core optical fiber 110 between the first reflective coating 81 and the second reflective coating 82. The optical beam 310 that is output from the opposing second end-face 114 through the reflective coating 82 has a narrow linewidth and low frequency noise fluctuations. For example, the optical beam 310 can have a frequency noise level substantially lower than a few Hz/√Hz outside servo bandwidth.

In the embodiments of the hollow-core optical fiber filters 100-103 shown in FIGS. 1A-3, the resonator round-trip path length 2L is uniquely defined as the path length from the first fiber end-face 112, through the hollow-core optical fiber 110 to the second fiber end-face 114, and back through the hollow-core optical fiber 110 to the first fiber end-face 112. This implementation provides for maximum stability of the hollow-core optical-fiber filters 100-103. The longer the optical-fiber filter is, the narrower (smaller) the linewidth of the output optical beam. High finesse and narrow linewidth are desirable conditions to provide an optical-fiber filter (low pass filter) with a low cutoff frequency. The lower the cutoff frequency of the filter is, the lower the laser frequency noise. In summary, the higher the finesse and the narrower the linewidth, the lower the corner frequency and the more effective the hollow-core optical-fiber filter is at reducing laser frequency noise. The transfer function for passing frequency noise fluctuations looks like that of a low pass electrical filter, where the filter does not reduce frequencies below its corner frequency, but rolls off, or progressively attenuates frequencies further and further beyond its corner frequency. The corner frequency is proportional to its linewidth.

The hollow-core optical fibers 110 have a relatively long path length and thus, provide a long optical delay time for filtering high frequency noise. Careful design of the hollow-core optical fiber filters 101-103 is required to ensure the resonant optical beam does not excite non-linear effects in the hollow-core optical fiber 110. These non-linear effects, such as the Kerr effect and stimulated Brillouin scattering (SBS), degrade the stability of the hollow-core optical-fiber filter and diminish the usefulness of the output beam 310. In an optical resonator, the power circulating in the hollow-core optical-fiber filter is much more intense than the output. If the circulating power is too high within the hollow-core optical-fiber filter, stimulated Brillouin scattering is generated. Stimulated Brillouin scattering causes large intensity fluctuations which corrupt the output of the hollow-core optical-fiber filter. A hollow core fiber is chosen because its SBS power threshold can be orders of magnitude higher than that of solid core fiber. The fiber length L, the reflective coating 81 or 87 on the first end-face 112, the reflective coating 82 or 85 on the second end-face 114, a mode field size of the hollow-core optical fiber 110, and a numerical aperture NA of the hollow-core optical fiber 110 are selected to prevent generation of non-linear effects in the hollow-core optical fiber 110 when the hollow-core optical fiber 110 functions as an optical resonator.

The limits of an exemplary hollow-core optical-fiber filter 100 designed to prevent generation of non-linear effects are now described. The exemplary hollow-core optical fiber 110 in the hollow-core optical-fiber filter 100 has a loss of 205 ppm/meter (1 dB/km) and a mode field diameter of 10.6μ. The hollow core fiber refractive index is estimated for resonator properties calculation at n=1.001 for a wavelength λ=1.544 μm. The power threshold at which the SBS begins ($P_{crit\ Brill}$) is related to the physical area of the fiber core, A, in $m^2$; the fiber loss, α, in $m^{-1}$; the gain coefficient of the guiding medium, $G_B$, in m/Watt; and the length L of the fiber in meters. Specifically, $P_{crit\ Brill}$ is calculated based on the following equation, where "*" is representative of the multiplicative sign: $P_{crit\ Brill} = 21*[(\alpha*A_{eff})/(\rho*g_B*(1-e^{-(\alpha L)})]$. For a nominal 6 meter hollow-core optical fiber 110 in which the loss α is 1.0 dB/km (~205 ppm/meter), the fraction p of power in hollow-core optical fiber is nominally 0.001 to 0.01, the SBS gain $G_B$ is $5\times10^{-11}$ meters/Watt (for silica), and a fiber mode field area is $8.8\times10^{-11}$ meters$^2$, the power threshold for SBS, $P_{crit\ Brill}$, is 740 Watts.

Table 1 shows the finesse, output power, circulating power, and SBS Onset power as a function of length L of the hollow-core optical fiber 110 for a 200 KHz hollow-core optical-fiber filter 100 with 200 kHz full-width-half-maximum (FWHM) peaks in the Airy function. Table 1 also shows the transmission (T) of the reflective coating. The power threshold at which the SBS begins ($P_{crit\ Brill}$) was calculated for ρ=0.0083. The circulating power column lists power circulating in the resonant filter in terms of unity input; the circulating power (W) column gives the circulating power in Watts, which is useful in estimating Brillouin threshold, based on an input of 2 W.

When a 2 Watt laser beam is coupled into the exemplary hollow-core optical-fiber filter 100 described above, the circulating power does not exceed the Brillouin threshold for the lengths of fiber shown in Table 1 (e.g., less than 8 meters). The output and circulating powers shown in Table 1 are normalized to unity input power. The circulating power in Watts assumes a 2 W input power.

TABLE 1

| Length (meters) | Finesse | Output Power | Circulating Power | Circulating Power (W) | SBS Onset (W) | T |
|---|---|---|---|---|---|---|
| 4.0 | 129 | 0.795 | 41.17 | 82.3 | 1110 | 0.0217 |
| 5.0 | 103 | 0.819 | 32.93 | 65.9 | 888 | 0.0275 |
| 6.0 | 86 | 0.835 | 27.44 | 54.9 | 740 | 0.0333 |
| 7.0 | 74 | 0.847 | 23.52 | 47.1 | 634 | 0.0391 |
| 8.0 | 65 | 0.856 | 20.58 | 41.2 | 555 | 0.0449 |

Figure 4:
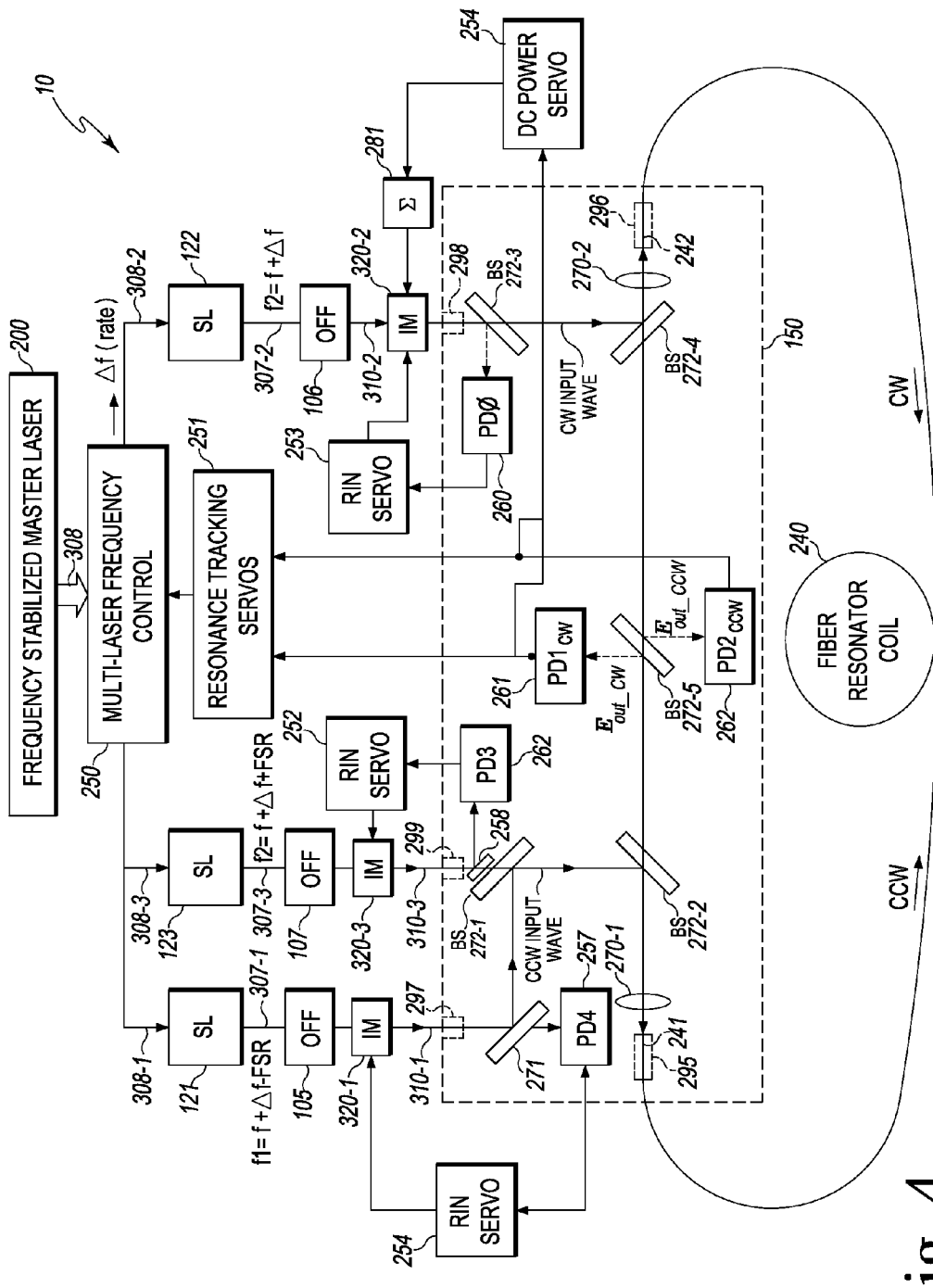
FIG. 4 is a block diagram of one embodiment of a resonator-fiber-optic gyroscope system that includes hollow-core optical-fiber filters in accordance with the present invention.

FIG. 4 is a block diagram of one embodiment of a resonator-fiber-optic gyroscope (RFOG) system 10 that includes hollow-core optical-fiber filters 105, 106, and 107 in accordance with the present invention. The RFOG system 10 is also referred to herein as an RFOG 10. The RFOG system 10 is a high performance gyroscope system. The RFOG 10 includes a frequency stabilized master laser 200, three slave lasers (SL) 121, 122, and 123, three respective hollow-core optical-fiber filters (OFF) 105, 106, and 107, three respective intensity modulators (IM) 320-1, 320-2, and 320-3, and a fiber resonator coil 240. The fiber resonator coil 240 is an optical fiber ring resonator that forms a fiber ring resonant cavity in the gyroscope. The fiber resonator coil 240 is also referred to herein as "fiber loop 240" and "sensing resonator 240". The fiber loop 240 is the optical fiber through which at least two optical beams counter-propagate. The output of the fiber loop 240 is used to determine the rate of rotation of the RFOG 10. In one implementation of this embodiment, there are only two optical-fiber filters 105 and 106 in the RFOG and two respective slave lasers 121 and 122. The hollow-core optical-fiber filters 105, 106, and 107 can be the exemplary optical-fiber filters 100, 103, 101, or 102 shown in FIG. 1A, 1B, 2, or 3, respectively. In another implementation of this embodiment, the master laser 200 and the three slave lasers (SL) 121, 122, and 123 are semiconductor laser diodes. The frequency noise of each laser is reduced by the use of the hollow-core optical-fiber filters 105, 106, and 107.

The frequency stabilized master laser 200 emits a reference optical beam 308. The reference optical beam 308 has low phase noise (e.g., less than 1 Hz/√Hz). The beam 308 is used to generate radio frequency (RF) beat signals between the master and slave lasers, which are used by phase locked loop (PLL) 250 (also referred to herein as "multi-laser frequency control 250") to lock the slave lasers 121, 122, and 123 to the master laser 200 with frequency separations determined by the resonance tracking servos 251. These beat signals are used by multi-laser frequency control 250, which receives feedback from resonance tracking servos 251, to precisely control the frequency of the optical beams of the slave lasers 121, 122, and 123.

The slave lasers 121, 122, and 123 have similar structure and function to the slave laser 120 shown in FIG. 2. As shown in FIG. 4, the slave laser 121 is locked to the reference optical beam 308-1 such that slave laser 121 emits light at a first frequency $f_1=f+\Delta f-FSR$, where f is the central frequency of master laser 200, $\Delta f$ is a frequency offset from the central frequency f, and the FSR is the free spectral range of the sensing resonator 240. The free spectral range (FSR) is the frequency separation between adjacent resonance peaks of the sensing resonator 240. The slave laser 122 is locked to the reference optical beam 308-2 such that slave laser 122 emits light at a second frequency $f_2=f+\Delta f$. The slave laser 123 is locked to the reference optical beam 308-3 such that slave laser 123 emits light at a third frequency $f_3=f+\Delta f+FSR$.

The hollow-core optical-fiber filters 105, 106, and 107 are arranged so that the respective output optical beams 307-1, 307-2, and 307-3 emitted from the slave lasers 121, 122, and 123 are coupled to the respective optical-fiber filters 105, 106, and 107. The hollow-core optical-fiber filters 105, 106, and 107 output low-noise, coherent optical beams 310-1, 310-2, and 310-3, respectively. The low-noise, coherent optical beams 310-1, 310-2, and 310-3 are coupled into respective intensity modulators 320-1, 320-2, and 320-3. As is known in the art, as the frequency noise of an optical beam is reduced, the coherence of the optical beam is increased.

The fiber resonator coil 240 (fiber loop 240) is an optical fiber that has a first coil end-face represented generally at 241 and a second coil end-face represented generally at 242. The low-noise, coherent optical beams 310-1 and 310-3 output from the hollow-core optical-fiber filters 105 and 107 are coupled to the first coil end-face 241 of the fiber resonator coil 240 via the respective intensity modulators 320-1 and 320-3. The low-noise, coherent optical beam 310-2 output from the hollow-core optical-fiber filter 106 is coupled to the second coil end-face 242 of the fiber resonator coil 240 via the intensity modulator 320-2.

The hollow-core optical-fiber filters 105, 106, and 107 each comprise a hollow-core optical fiber 110 having a first end-face 112 and an opposing second end-face 114. The first end-face 112 and the second end-face 114 are in contact with reflective coatings 81 and 82, respectively.

The optical beam 307-1 emitted from the first slave laser 121 is coupled to the first end-face 112 of the first optical-fiber filter 105. A first low-noise, coherent optical beam 310-1 is output from the second end-face 114 of the first optical-fiber filter 105 and is coupled (via the intensity modulator 320-1 and optical elements including beam splitters 271, 272(1-2) and lens 270-1) to the first coil end-face 241 of the fiber resonator coil 240. Other coupling configurations of optical elements are possible as is understandable to one skilled in the art. The portion of the optical beam 310-1 coupled into the fiber resonator coil 240 at the first coil end-face 241 propagates through the fiber resonator coil 240 in a counter-clockwise (CCW) direction.

The optical beam 307-2 emitted from the second slave laser 122 is coupled to the first end-face 112 of the second optical-fiber filter 106. A second low-noise, coherent optical beam 310-2 is output from the second end-face 114 of the second optical-fiber filter 106 and is coupled (via the intensity modulator 320-2 and optical elements including beam splitters 272(3-4) and lens 270-2) to the second coil end-face 242 of the fiber resonator coil 240. The portion of the optical beam 310-2 coupled into the fiber resonator coil 240 at the second coil end-face 242 propagates through the fiber resonator coil 240 in a clockwise (CW) direction.

The optical beam 307-3 emitted from the third slave laser 131 is coupled to the first end-face 112 of the third optical-fiber filter 107. A third low-noise, coherent optical beam 310-3 is output from the second end-face 114 of the third optical-fiber filter 107 and is coupled (via the intensity modulator 320-3 and optical elements including the beam splitters 272(1-2) and lens 270-1) to the first coil end-face 241 of the fiber resonator coil 240. The portion of the optical beam 310-3 coupled into the fiber resonator coil 240 at the first coil end-face 241 propagates through the fiber resonator coil 240 in a counter-clockwise (CCW) direction. In one implementation of this embodiment, the lenses 270(1-2) are ball lenses.

The light coupled into the fiber resonator coil 240 circulates multiple times within the fiber resonator coil 240 by transit through the lenses 270-1 and 270-2 and the beam splitters 272-2, 272-5, and 272-4. A portion (e.g., 1 to 20%) of the light propagating in the clockwise (CW) direction is reflected by beam splitter 272-5 into the detector (PD1$_{CW}$) 261. A portion (e.g., 1 to 20%) of the light propagating in the counter-clockwise (CCW) direction is reflected by beam splitter 272-5 into the detector (PD2$_{CCW}$) 262. Information indicative of the amount of optical power detected at the detectors 261 and 262 is sent as signals to the resonance tracking servos 251 and to the DC power servo 254. The resonance tracking servos 251 send signals to the multi-laser frequency control 250, which adjusts the frequency of the optical beams of the slave lasers 121, 122, and 123, as needed, to the resonance peaks of the sensing resonator 240. The DC power servo 254 sends signals to the summation circuit (Σ) 281 to adjust the power of the optical beam 310-2 output from the hollow-core optical-fiber filter 106 through the intensity modulator 320-2. This adjustment is done in order to balance the power in CW and CCW direction so that optical Kerr effect induced cavity length difference is minimized.

The exemplary RFOG 10 shown in FIG. 4 also includes a relative intensity noise (RIN) detector (PD3) 262 that receives a portion (e.g., 1 to 10%) of the optical beam 310-3 from the intensity modulator 320-3 via beam splitter 258. RIN detector 262 measures the intensity noise of the optical beam 310-3 (before it is combined with the optical beam 310-1) that is being input to the first coil end-face 241 of the fiber resonator coil 240. The RIN signal from the RIN detector 262 provides signal feedback to a RIN servo electronic system 252. The electronic signal sent to the intensity modulator 320-3 from the RIN servo electronic system 252 adjusts the total light intensity of the input optical beam 310-3 passing through the intensity modulator 320-3, so that the undesirable fluctuations in intensity due to RIN are eliminated or substantially reduced. In this manner, the RIN servo loop is used to reduce the intensity noise or unwanted intensity or amplitude modulation of the input optical beam 310-3 passed through intensity modulator 320-3.

The exemplary RFOG 10 shown in FIG. 4 also includes a relative intensity noise (RIN) detector (PD4) 257 that receives a portion (e.g., 1 to 10%) of the optical beam 310-1 from the intensity modulator 320-1. RIN detector 257 measures the intensity noise of the optical beam 310-1 (before it is combined with beam 310-3) that is being input to the first coil end-face 241 of the fiber resonator coil 240. The RIN signal from the RIN detector 257 provides signal feedback to a RIN servo electronic system 254. The electronic signal sent to the intensity modulator 320-1 from the RIN servo electronic system 254 adjusts the total light intensity of the input optical beam 310-1 passing through the intensity modulator 320-1, so that the undesirable fluctuations in intensity due to RIN are eliminated or substantially reduced. In this manner, the RIN servo loop is used to reduce the intensity noise or unwanted intensity or amplitude modulation of the input optical beam 310-1 passed through intensity modulator 320-1.

The exemplary RFOG 10 shown in FIG. 4 also includes a RIN detector (PD0) 260 that receives a portion (e.g., 1 to 10%) of the optical beam 310-2 from the intensity modulator 320-2. The RIN signal from the RIN detector 260 provides signal feedback to a RIN servo electronic system 253. The electronic signal sent to the intensity modulator 320-2 from the RIN servo electronic system 253 adjusts the total light intensity of the input optical beam 310-2 passing through the intensity modulator 320-2, so that the undesirable fluctuations in intensity due to RIN are eliminated or substantially reduced. In this manner, the RIN servo loop is used to reduce the intensity noise or unwanted intensity or amplitude modulation of the input optical beam 310-2 passed through intensity modulator 320-2.

The exemplary RFOG 10 shown in FIG. 4 also includes a silicon optical bench (SiOB) 150. The silicon optical bench 150 includes grooves 295 and 296 etched into a surface of the silicon optical bench 150 to optically align the first fiber coil end-face 241 and the second coil end-face 242 to each other. The silicon optical bench 150 also includes provisions (such as, grooves, alignment features, or trenches) for positioning of optical elements (such as, lenses, beam splitters, and/or mirrors) used to align and direct optical beams 310-1, 310-3 into fiber end-face 241, and beam 310-2 into fiber end-face 242. The first coil end-face 241 of the fiber resonator coil 240 is positioned in a first groove 295 in the silicon optical bench 150. The second coil end-face 242 of the fiber resonator coil 240 is positioned in the second groove 296 in the silicon optical bench 150. The grooves 295 and 296 are etched to a depth such that the center of the core of the optical fiber of the fiber resonator coil 240 is precisely aligned to the optical beams 310(1-3) when the first coil end-face 241 and the second coil end-face 242 are positioned in the grooves 295 and 296. Likewise, the grooves 295 and 296 are etched to a depth such that the core of the first coil end-face 241 and the second coil end-face 242 are aligned to each other to create the fiber ring resonant cavity.

Figure 5:
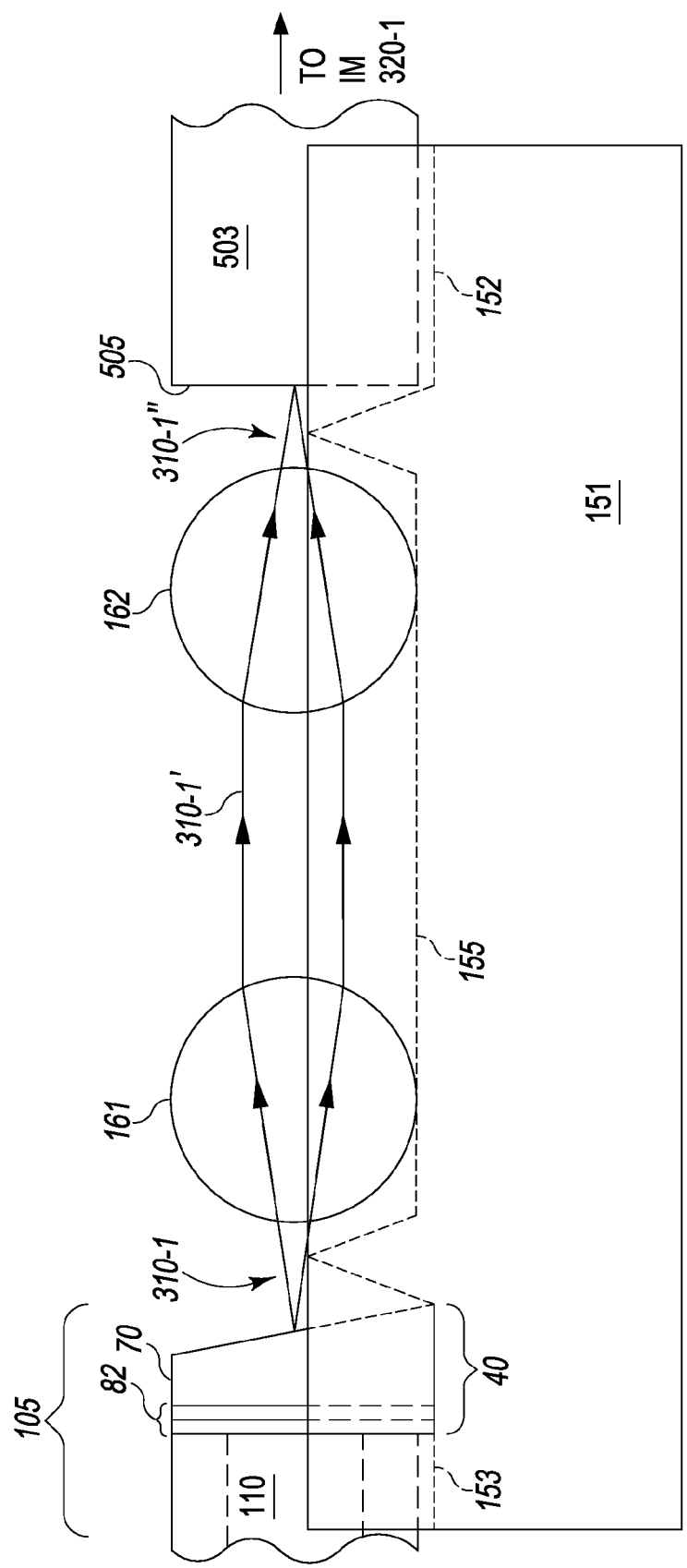
FIG. 5 is a block diagram of one embodiment of a hollow-core optical-fiber filter coupled to a pigtailed intensity modulator in accordance with the present invention.

FIG. 5 is a block diagram of one embodiment of a hollow-core optical-fiber filter 105 coupled to a pigtailed intensity modulator 320-1 (FIG. 4) in accordance with the present invention. In this embodiment, a fiber pigtail 503 with an end-face 505 is coupled to couple the input beam 310-1 to the intensity modulator 320-1. The end-face 505 of the fiber pigtail 503 is positioned in a groove 152 of a silicon substrate 151. The first ball lens 161 and the second ball lens 162 are positioned in an etched region 155 of the silicon substrate 151. The output end of the hollow-core optical-fiber filter 105 (including the reflective end-cap 40) is positioned in an etched region 153 (also referred to herein as first etched region 153) in the silicon substrate 151. The two ball lenses 161 and 162 couple the optical beam 310-1 output from the hollow-core optical-fiber filter 105 into the end-face 505 of the fiber pigtail 503 of the intensity modulator 320-1.

As shown in FIG. 5, the first ball lens 161 and the second ball lens 162 are positioned to collimate the low-noise, coherent optical beam propagating there between. In this exemplary alignment, the optical beam 310-1 output from the hollow-core optical-fiber filter 105 is coupled to the first ball lens 161 and exits the first ball lens 161 as a collimated optical beam 310-1'. The collimated optical beam 310-1' is incident on the second ball lens 162. The second ball lens 162 focuses the light as optical beam 310-1" on the end-face 505 of the fiber pigtail 503 of the intensity modulator 320-1. In one implementation of this embodiment, optical components (such as beam splitters 272(1-2)) are positioned in the collimated optical beam 310-1' to direct the light 310-1' between the first ball lens 161 and the second ball lens 162. In such an embodiment, there may be trenches (not shown in the silicon optical bench 151) to hold the light directing components. In like manner, the output of the intensity modulator 320-1 may be coupled into the silicon optical bench 150 by laying an output fiber pigtail (not shown) of the intensity modulator 320-1 into groove 297 (FIG. 4) to couple input beam 310-1 into the resonator fiber end-face 241 via beam splitters 271, 272(1-2) and lens 270-1 located on the silicon optical bench 150 (FIG. 4).

A similar arrangement is possible to couple the optical beams 310-2 and 310-3 output from the hollow-core optical-fiber filters 106 and 107, respectively, to fiber pigtails of the intensity modulators 320-2 and 320-3, respectively, via silicon substrates (not shown). For example, a third ball lens (not shown) and a fourth ball lens (not shown) can be configured to collimate the low-noise, coherent optical beam 310-2 propagating there between. In one implementation of this embodiment, an integrated silicon optical bench is used to align optical beam outputs from the hollow-core optical-fiber filters 105, 106, and 107 to the intensity modulators 320-1, 320-2, and 320-3, respectively, and to align the output of the intensity modulators 320-1, 320-2, and 320-3 to the fiber resonator coil 240.

In another implementation of this embodiment, the second end-face 114 and the second reflective end-cap 41 of the first hollow-core optical-fiber filter 105 is positioned in an etched region 297 in the silicon optical bench 150; the second end-face 114 and the second reflective end-cap 41 of the second hollow-core optical-fiber filter 106 is positioned in an etched region 298 in the silicon optical bench 150; and the second end-face 114 and the second reflective end-cap 41 of the third hollow-core optical-fiber filter 107 is positioned in an etched region 299 in the silicon optical bench 150. The etched regions 297, 298, and 299 formed in the silicon optical bench 150 are shaped to stably hold the second end-face 114 and the second reflective end-cap 41. In this case, the intensity modulators 320-1, 320-2, and 320-3 are mounted on the silicon optical bench and optical beams 310-1, 310-2 and 310-3 are introduced to the intensity modulators 320-1, 320-2, and 320-3 after exiting filter endcaps 41 (see FIG. 1) located in etched regions 297, 298, and 299 in the silicon optical bench 150. In some embodiments of this latter configuration, there is no third hollow-core optical-fiber filter 107 is positioned in an etched region 299 in the silicon optical bench 150.

Thus, silicon optical benches 151 and/or 150 include grooves (e.g., grooves 297-299, 152, 152, and/or etched regions 155) to position optical elements (e.g., first ball lens 161, second ball lens 162, beam splitters 271, 272(1-5), and/ or lens 270(1-2)), which align and direct at least two low-noise, coherent optical beams (e.g., 310(1-3)) output from the at least two hollow-core optical-fiber filters (e.g., 105-107) to the first coil end-face 241 and the second coil end-face 242 and between the first coil end-face 241 and the second coil end-face 242. Housing the fiber resonator coil 240 on a silicon optical bench 150 provides a low cost implementation of the RFOG 10.

Figure 6:
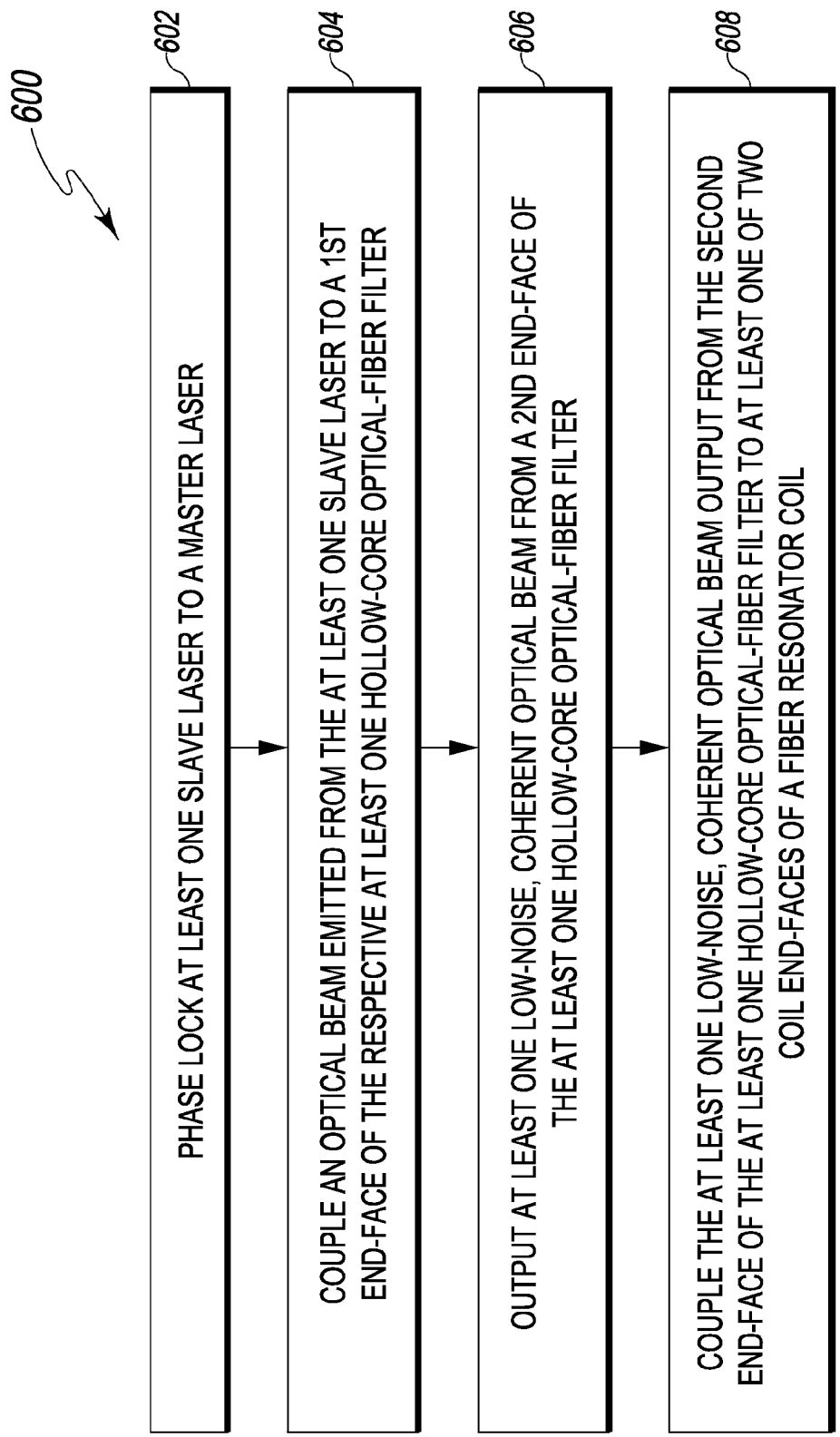
FIG. 6 is a flow diagram of one embodiment of a method to generate at least one low-noise, coherent optical beam for use in a resonator-fiber-optic gyroscope system in accordance with the present invention.

FIG. 6 is a flow diagram of one embodiment of a method 600 to generate at least one low-noise, coherent optical beam for use in a resonator-fiber-optic gyroscope system 10 in accordance with the present invention. The method 600 is described with reference to FIGS. 1A and 4 although it is to be understood that RFOGs configured with other coupling arrangements can be used.

At block 602, an optical beam 308 emitted from a master laser 200 is used to control at least one slave laser 121. The at least one slave laser 121 is phase locked to the master laser 200. The three slave lasers 121, 122, and 123 are phase locked to the master laser 200 with frequency separations determined by the resonance tracking servos 251. As shown in FIG. 4, the first slave laser 121 is locked to a first frequency $f_1=f+\Delta f-FSR$; the second slave laser 122 is locked to a second frequency $f_2=f+\Delta f$; and the third slave laser 122 is locked to mode at a third frequency $f_3=f+\Delta f+FSR$.

At block 604, an optical beam 307 that is emitted from the at least one slave laser 121 is coupled to a respective at least one hollow core optical-fiber filter 102. As shown in FIG. 4, the optical beam 307-1 emitted from the first slave laser 121 (at a first frequency $f_1=f+\Delta f-FSR$) is coupled to the first end-face 112 of the first hollow-core optical-fiber filter 105; the optical beam 307-2 emitted from the second slave laser 122 (at a second frequency $f_2=f+\Delta f$) is coupled to the first end-face 112 of the second hollow-core optical-fiber filter 106; and the optical beam 307-3 emitted from the third slave laser 123 (at a third frequency $f_3=f+\Delta f+FSR$) is coupled to the first end-face 112 of the third hollow-core optical-fiber filter 107.

At block 606, at least one low-noise, coherent optical beam 310 is output from the respective at least one hollow-core optical-fiber filter 105. As shown in FIG. 4, a low-noise, coherent optical beam 310-1 is output from the second end-face 114 of the first hollow-core optical-fiber filter 105; a low-noise, coherent optical beam 310-2 is output from the second end-face 114 of the second hollow-core optical-fiber filter 106; and a low-noise, coherent optical beam 310-3 is output from the second end-face 114 of the third hollow-core optical-fiber filter 107.

At block 608, the at least one low-noise, coherent optical beam 310-1 output from the second end-face 114 of the at least one hollow-core optical-fiber filter 105 is coupled to at least one of two coil end-faces (such as, first coil end-face 241 and second coil end-face 242) of a fiber resonator coil 240 that has resonance frequencies that are sensitive to rotation rate. As shown in FIG. 4, the low-noise, coherent optical beam 310-1 output from the second end-face 114 of the first hollow-core optical-fiber filter 105 is coupled to the first coil end-face 241 of the fiber resonator coil 240 via the intensity modulator 320-1 and other optical elements positioned to align and direct the low-noise, coherent optical beam 310-1 output to the first coil end-face 241.

Likewise, FIG. 4 shows the low-noise, coherent optical beam 310-2 output from the second end-face 114 of the second hollow-core optical-fiber filter 106 is coupled to the second coil end-face 242 of the fiber resonator coil 240 via the intensity modulator 320-2 and other optical elements positioned to align and direct the low-noise, coherent optical beam 310-2 output to the second coil end-face 242.

Likewise, FIG. 4 shows the low-noise, coherent optical beam 310-3 output from the second end-face 114 of the third hollow-core optical-fiber filter 107 is coupled to the first coil end-face 241 of the fiber resonator coil 240 via the intensity modulator 320-3 and other optical elements positioned to align and direct the low-noise, coherent optical beam 310-3 output to the first coil end-face 241. In one implementation of this embodiment, there is no third slave laser 123 and there is no hollow-core optical-fiber filter 107 in the RFOG system 10.

In one implementation of this embodiment, the first coil end-face 241 is positioned in a first groove 295 in a silicon optical bench 150 and a second coil end-face 242 is positioned in a second groove 295 in the silicon optical bench 150.

In yet another implementation of this embodiment, the first low-noise, coherent optical beam 310-1 is coupled to the first coil end-face 241 positioned in a first groove 295 in the silicon optical bench 150 via at least one ball lens 161 positioned in a first etched region 155 (FIG. 5) of the silicon optical bench 150; the second low-noise, coherent optical beam 310-2 is coupled to the second coil end-face 242 positioned in the second groove 296 in the silicon optical bench 150 via at least one ball lens 161 positioned in a second etched region (e.g., etched region 298 shown in FIG. 4) in the silicon optical bench 150; and the third low-noise, coherent optical beam 310-3 is coupled to the first coil end-face 241 positioned in the first groove 295 in the silicon optical bench 150 via at least one ball lens 161 positioned in a third etched region (e.g., etched region 299 shown in FIG. 4) of the silicon optical bench 150. In some embodiments of this latter configuration, there is no third low-noise, coherent optical beam 310-3 and no ball lens 161 positioned in a third etched region 299.

In this manner, an inexpensive RFOG system uses low cost semiconductor laser diodes and improves optical filtering (by use of the hollow-core optical-fiber filters) to reduce the phase noise of the laser diodes, so the low cost RFOG system has an improved performance. In one implementation of this embodiment, the hollow-core optical-fiber filter 100-107 is used in a system that includes a single laser and a frequency shifter.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A hollow-core optical-fiber filter comprising:
    an optically-inactive-hollow-core optical fiber having a first end-face and an opposing second end-face, the first end-face and the second end-face setting a fiber length;
    a first reflective end-cap positioned at the first end-face; and
    a second reflective end-cap positioned at the second end-face, wherein at least one of the first reflective end-cap and the second reflective end-cap is a beveled end-cap, and wherein, when an optical beam from a laser is coupled into one of the first end-face or the second end-face, an optical output from the opposing end-face has a narrow linewidth and low frequency noise fluctuations.

2. The filter of claim 1, wherein the first reflective end-cap includes a first reflective surface and wherein the second reflective end-cap includes a second reflective surface, wherein, when an optical beam from the laser is coupled into one of the first end-face or the second end-face, a resonant cavity is established between the first reflective surface and second reflective surface.

3. The filter of claim 1, wherein the first reflective end-cap includes:
    a first reflective surface having a first reflectivity;
    a first anti-reflective surface opposing the first reflective surface, and wherein the second reflective end-cap includes:
    a second reflective surface having a second reflectivity;
    a second anti-reflective surface opposing the second reflective surface wherein, when an optical beam from the laser is coupled into one of the first end-face or the second end-face, a resonant cavity is established between the first reflective surface and second reflective surface.

4. The filter of claim 1, wherein the first reflective end-cap is a first beveled end-cap, including:
    a first surface having a first reflectivity; and
    a second surface, wherein the first surface and the second surface of the first beveled end-cap are in planes that intersect at a first acute angle, and wherein the second reflective end-cap is a second beveled end-cap including:
    a first surface having a second reflectivity; and
    a second surface, wherein the first surface and the second surface of the second beveled end-cap are in planes that intersect at a second acute angle, when an optical beam from the laser is coupled into one of the first end-face or the second end-face, a resonant cavity is established between the first surface of the of the first beveled end-cap and the first surface of the second beveled end-cap.

5. The filter of claim 4, wherein the second surface of the first beveled end-cap is coated with an anti-reflection coating, and wherein the second surface of the second beveled end-cap is coated with an anti-reflection coating.

6. The filter of claim 1, wherein the fiber length, a first reflectivity of the first reflective end-cap, a second reflectivity of the second reflective end-cap, a mode field size of the hollow-core optical fiber, and a numerical aperture of the hollow-core optical fiber are selected to prevent generation of non-linear effects in the hollow-core optical fiber.

7. A method of generating at least one low-noise, coherent optical beam for use in a resonator-fiber-optic gyroscope system, the method comprising:
    phase locking at least one slave laser to a master laser;
    coupling an optical beam emitted from the at least one slave laser to a first end-face of a respective at least one hollow-core optical-fiber filter, the at least one hollow-core optical-fiber filter including;
        an optically-inactive-hollow-core optical fiber having a first end-face and an opposing second end-face, the first end-face and the second end-face setting a fiber length;
        a first reflective end-cap positioned at the first end-face; and
        a second reflective end-cap positioned at the second end-face, wherein at least one of the first reflective end-cap and the second reflective end-cap is a beveled end-cap,
    wherein a respective at least one low-noise, coherent optical beam is output from the second end-face of the at least one hollow-core optical-fiber filter; and
    coupling the at least one low-noise, coherent optical beam output from the second end-face of the at least one hollow-core optical-fiber filter to at least one of two coil end-faces of a fiber resonator coil.

8. The method of claim 7, wherein the at least one slave laser includes at a first slave laser and a second slave laser, wherein the at least one hollow-core optical-fiber filter further includes:
    a first hollow-core optical-fiber filter wherein the first end-face is in contact a reflective coating on the first reflective end-cap and the second end-face is in contact with a reflective coating on the second reflective end-cap; and
    a second hollow-core optical-fiber filter wherein the first end-face is in contact a reflective coating on a third reflective end-cap and the second end-face is in contact with a reflective coating on a fourth reflective end-cap, the method further comprising:
    coupling the optical beam output from the first slave laser to the first end-face of the first hollow-core optical-fiber filter, wherein a first low-noise, coherent optical beam is output from the second end-face of the first hollow-core optical-fiber filter; and
    coupling the optical beam output from the second slave laser to the first end-face of the second hollow-core optical-fiber filter, wherein a second low-noise, coherent optical beam is output from the second end-face of the second hollow-core optical-fiber filter.

9. The method of claim 8, further comprising:
coupling the first low-noise, coherent optical beam to a first coil end-face of a fiber resonator coil; and
coupling the second low-noise, coherent optical beam to a second coil end-face of the fiber resonator coil.

10. The method of claim 9, further comprising:
positioning the first coil end-face in a first groove in a silicon optical bench; and
positioning the second coil end-face in a second groove in the silicon optical bench.

11. The method of claim 10, further comprising:
positioning the second end-face and the second reflective end-cap of the first hollow-core optical-fiber filter in a first etched region in the silicon optical bench; and
positioning the second end-face and the fourth reflective end-cap of the second hollow-core optical-fiber filter in a second etched region in the silicon optical bench.

12. The method of claim 9, wherein coupling the first low-noise, coherent optical beam to the first coil end-face of a fiber resonator coil comprises:
coupling the first low-noise, coherent optical beam to the first coil end-face positioned in a first groove in a silicon optical bench via at least one ball lens positioned in a first etched region of the silicon optical bench; and
wherein coupling the second low-noise, coherent optical beam to a second coil end-face of the fiber resonator coil comprises:
coupling the second low-noise, coherent optical beam to the second coil end-face positioned in a second groove in the silicon optical bench via at least one ball lens positioned in a second etched region of the silicon optical bench.

13. The method of claim 12, wherein the at least one ball lens positioned in the first etched region of the silicon optical bench includes a first ball lens and a second ball lens and wherein the at least one ball lens positioned in the second etched region of the silicon optical bench includes a third ball lens and a fourth ball lens, the method further comprising:
positioning the first ball lens and the second ball lens to collimate the low-noise, coherent optical beam propagating there between; and
positioning the third ball lens and the fourth ball lens to collimate the low-noise, coherent optical beam propagating there between.

14. The method of claim 8, wherein the at least one slave laser further includes a third slave laser further, wherein the at least one hollow-core optical fiber-filter further includes a third hollow-core optical-fiber filter, and wherein the first end-face of the third hollow-core optical-fiber filter is in contact a reflective coating on a fifth reflective end-cap and the second end-face of the third hollow-core optical-fiber filter is in contact with a reflective coating on a sixth reflective end-cap, the method further comprising:
coupling the optical beam output from the third slave laser to the first end-face of the third hollow-core optical-fiber filter, wherein a third low-noise, coherent optical beam is output from the second end-face of the third hollow-core optical-fiber filter; and
coupling the third low-noise, coherent optical beam to a first coil end-face of the fiber resonator coil.

15. A resonator-fiber-optic gyroscope comprising:
a frequency stabilized master laser emitting a reference optical beam having low phase noise;
at least two slave lasers arranged so that the reference optical beam controls the respective at least two slave lasers;
at least two hollow-core optical-fiber filters arranged so that optical beams emitted from the at least two slave lasers are coupled to the respective hollow-core optical-fiber filters, wherein low-noise, coherent optical beams are output from the respective hollow-core optical-fiber filters; and
a fiber resonator coil having a first coil end-face and a second coil end-face,
wherein an optical beam output from one of the at least two hollow-core optical-fiber filters is coupled to the first coil end-face of the fiber resonator coil, and
wherein an optical beam output from another one of the at least two hollow-core optical-fiber filters is coupled to the second coil end-face of the fiber resonator coil.

16. The resonator-fiber-optic gyroscope of claim 15, wherein the at least two hollow-core optical-fiber filters each comprise a hollow-core optical fiber having a first end-face and an opposing second end-face, the first end-face and the second end-face setting a fiber length, the first end-face in contact a first reflective coating on a first reflective end-cap and the second end-face in contact a second reflective coating on a second reflective end-cap, wherein the fiber length, the first reflective coating on the first reflective end-cap, the second reflective coating on the second reflective end-cap, a mode field size of the hollow-core optical fiber, and a numerical aperture of the hollow-core optical fiber are selected to prevent generation of non-linear effects in the hollow-core optical fibers of the at least two hollow-core optical-fiber filters.

17. The resonator-fiber-optic gyroscope of claim 15, wherein the optical beam emitted from a first slave laser is coupled to a first end-face of a first hollow-core optical-fiber filter, wherein a first low-noise, coherent optical beam output from a second end-face of the first hollow-core optical-fiber filter is coupled to the first coil end-face of the fiber resonator coil, and
wherein the optical beam emitted from a second slave laser is coupled to a first end-face of a second hollow-core optical-fiber filter, wherein a second low-noise, coherent optical beam output from a second end-face of the second hollow-core optical-fiber filter is coupled to the second coil end-face of the fiber resonator coil.

18. The resonator-fiber-optic gyroscope of claim 17, wherein the optical beam emitted from a third slave laser is coupled to a first end-face of a third hollow-core optical-fiber filter, wherein a third low-noise, coherent optical beam output from a second end-face of the third hollow-core optical-fiber filter is coupled to the first coil end-face of the fiber resonator coil.

19. The resonator-fiber-optic gyroscope of claim 15, further comprising:
a silicon optical bench including grooves to position optical elements configured to align and direct the low-noise, coherent optical beams output from the at least two hollow-core optical-fiber filters to the first coil end-face and the second coil end-face.

20. The resonator-fiber-optic gyroscope of claim 19, wherein the optical elements include at least one optically transparent ball lens positioned in a respective at least one etched region in the silicon optical bench.

* * * * *